July 21, 1959   M. IRELAND   2,895,404
POWER DRIVE FOR AUTOMATIC TOASTER
Filed Sept. 11, 1956   2 Sheets-Sheet 1
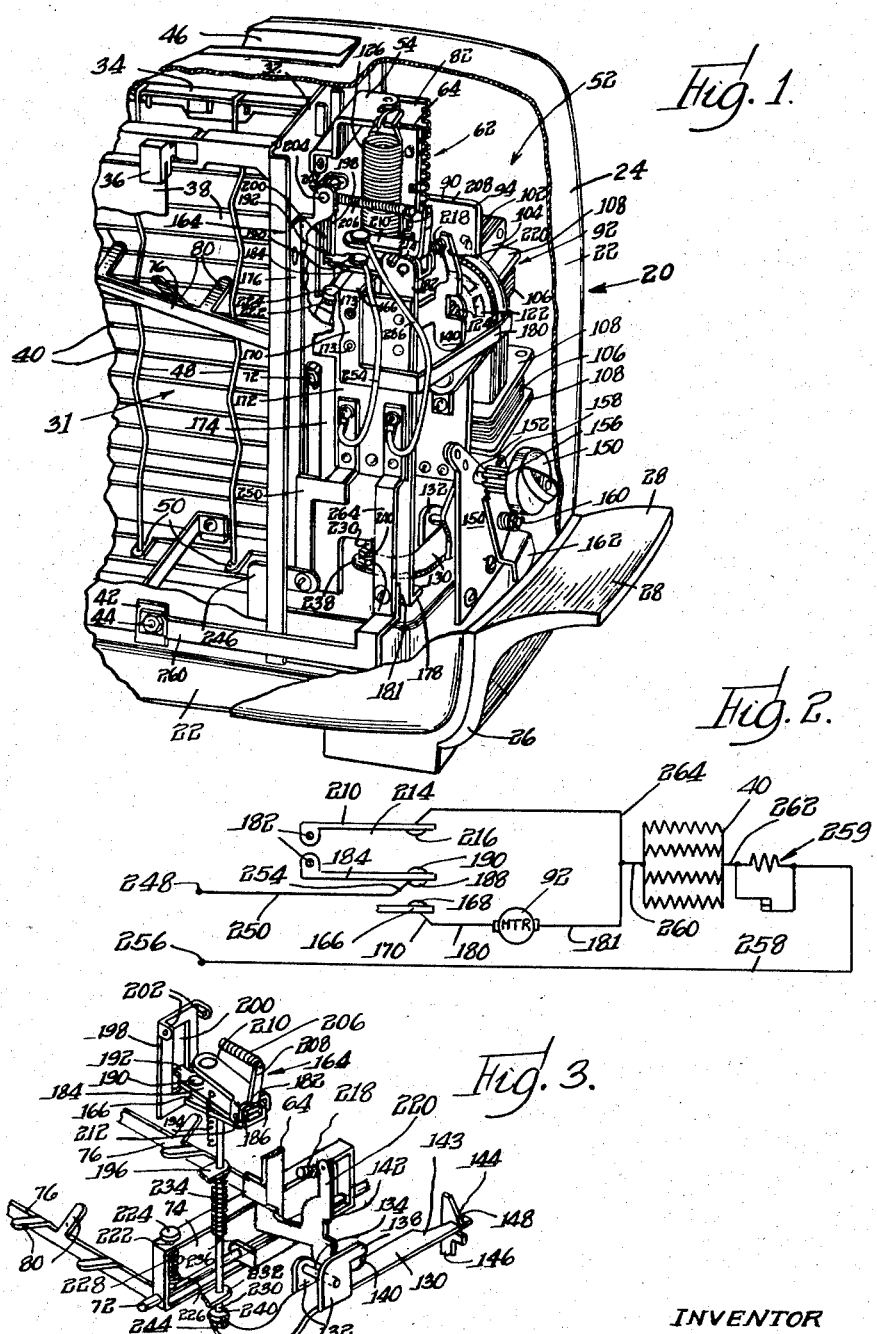
INVENTOR
Murray Ireland
By Karl H. Sommermeyer
Atty.

July 21, 1959 M. IRELAND 2,895,404
POWER DRIVE FOR AUTOMATIC TOASTER
Filed Sept. 11, 1956 2 Sheets-Sheet 2
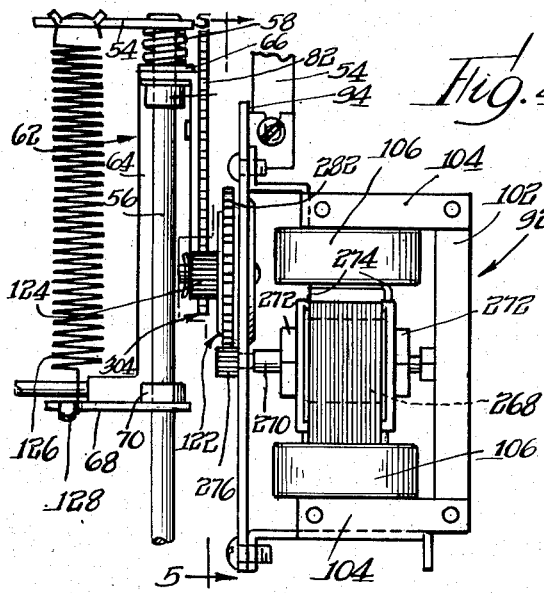
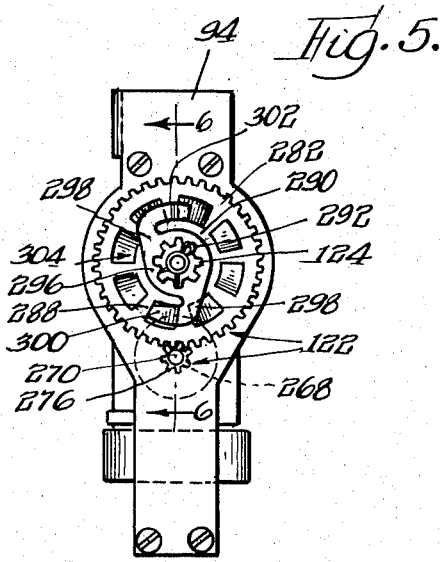
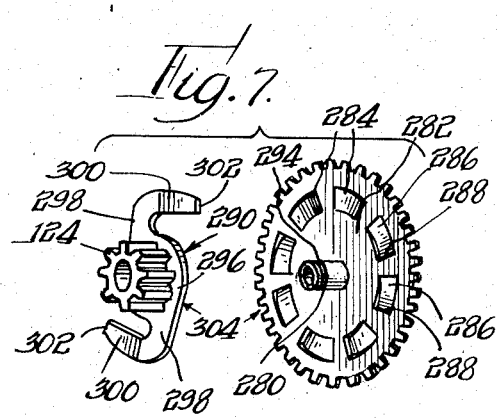
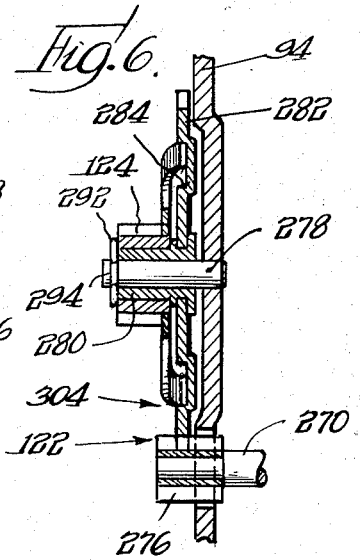
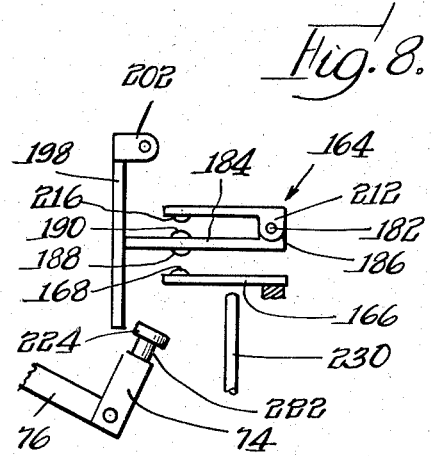
INVENTOR.
Murray Ireland
BY
Karl H. Sommermeyer
atty.

United States Patent Office 2,895,404
Patented July 21, 1959

2,895,404

POWER DRIVE FOR AUTOMATIC TOASTER

Murray Ireland, Elgin, Ill., assignor to McGraw-Edison Company, Elgin, Ill., a corporation of Delaware Application September 11, 1956, Serial No. 609,120

5 Claims. (Cl. 99—329)

This invention is concerned with an electric toaster, and particularly with a power drive for an automatic toaster.

In some types of so-called automatic electric toasters the toast carrying carriage is lowered manually, and then is spring returned after a predetermined toasting time. In the more advanced types of automatic toasters a motor device is used to lower the carriage, and the carriage is spring returned. Considerable shocks often are imposed on the drive train, particularly when the carriage reaches its uppermost limited position under the influence of the spring. The carriage generally is raised rapidly by the spring, and the motor is driven in reverse through the drive train. When the carriage is arrested the inertia of the motor tends to keep the motor in motion, and this results in shocks and unnecessary wear in many of the parts of the toaster.

Accordingly, it is an object of this invention to provide a motor driven automatic toaster wherein physical shock to the drive train is substantially eliminated.

More specifically, it is an object to provide an automatic toaster having a motor for moving the carriage in one direction and a spring for moving the carriage in the other direction, a drive train between the motor and carriage incorporating an overrunning clutch.

Other and further objects and advantages of the present invention will be apparent from the following description when taken in connection with the accompanying drawings wherein:

Fig. 1 is a fragmentary perspective view of a toaster embodying the principles of the invention with part of the casing or housing being broken away for clarity of illustration;

Fig. 2 is a wiring diagram schematically illustrating the principles of the invention;

Fig. 3 is a perspective view of the switching mechanism;

Fig. 4 is a fragmentary end view showing the motor and the connection thereof to the carriage;

Fig. 5 is a vertical view as taken along the line 5—5 in Fig. 4 with the rack completely removed for clarity of illustration;

Fig. 6 is a sectional view taken along the line 6—6 in Fig. 5;

Fig. 7 is an exploded perspective view of the clutch and associated parts; and

Fig. 8 is a fragmentary view showing the switch mechanism in one position of operation.

Referring now in greater particularity to the figures, and first to Fig. 1, there will be seen a toaster 20 including the usual frame 22 to which a housing, casing, or shell 24 is secured by any suitable means such as sheet metal screws (not shown). Thermal insulating end pieces 26, such as molded plastic, are secured to the casing by any suitable means and include handles 28 for lifting the toaster. Rubber or other resilient, non-marring feet (not shown) preferably are mounted beneath the thermal end pieces 26 for supporting the toaster on the table or the like.

The toaster is provided with toasting ovens 31 including a pair of spaced apart end plates 32 (only one being shown) extending upwardly from the frame 20 to which they are secured by any known or suitable means. Four angle bars 34 extend between the end pieces 32, and insulating pieces 36 made of some suitable material such as porcelain are carried by the angle bars 34 and support the top edges of mica sheets 38. The heating elements or toasting coils 40 are wound on these mica sheets, and preferably are formed of the usual flat ribbon or resistance wire commonly used for such toasting coils or heating elements. The lower edges of the mica sheets are supported from the frame 20 by means of suitable insulating pieces 42, and certain of these pieces also serve to provide insulating mounts for terminals 44 of the toaster windings or heating elements.

The mica sheets 38 are provided in the usual spaced apart pairs, and elongated slots 46 are provided in the top of the casing to allow insertion and removal of the bread into and from the toasting oven provided by the heating elements and mica sheets. Wire spacers 48 of the usual zigzag configuration extend from the angle bars 34 down to suitable tabs 50 on the lower frame suitably to space bread slices from the toasting coils 40 on the mica sheets.

Suitable operating means 52 are mounted on the right-hand end plate 32 and on the frame 22 immediately adjacent thereto. The operating means 52 includes a bracket 54 affixed to the right-hand end plate 32. The bracket 54 supports the upper end of the carriage rod 56, the lower end being suitably carried by the frame 20. A spring 58 (Fig. 4) encircles the upper end of the rod 56 immediately beneath its mounting on the bracket 54 to provide a resilient stop or shock absorber for the carriage hereinafter to be disclosed.

A carriage 62 (see also Fig. 4) is slidably mounted on the rod 56 and includes a vertical angle piece 64 having upper and lower horizontal flanges 66 and 68 respectively provided with aligned apertures and suitable bushings and bearings 70 which slidably mount the carriage on the rod 56.

A horizontal pivot rod 72 (Figs. 1 and 3) is suitably carried by the carriage 62 and pivotally mounts a rectangular, box-shaped bracket 74. This bracket carries a pair of bread or toast carriers 76 which are affixed thereto in any suitable manner. The two toast carriers each take the form of an elongated arm, the outermost end of which extends through a guide slot (not shown) in the left end wall 32 (not shown). Spaced lugs or ears 80 are provided on the arms and are integral therewith, extending laterally at an angle thereto, suitably to support bread slices.

A rack 82 is mounted on one side of the vertical angle member 64 of the carriage 62. A motor 92 is mounted on the end plate 32 by means of a bracket 94 suitably carried from the bracket 54. The lower end of the bracket 94 is supported by means of another bracket (not shown) carried from the frame 22. The motor further is mounted by means of brackets, such as the bracket 104, secured to the horizontal portions of the motor frame 102.

In addition to the foregoing, the motor includes coil windings 106 positioned between suitable insulating pieces 108. The motor is provided with the usual poles and rotor (not shown) and the rotor acts through a gear train 122 to drive a pinion 124 meshing with the rack 82. When the motor is energized by means hereinafter to be set forth, it rotates the pinion 124 to lower the rack, and hence to lower the carriage and the toast carriers 76.

A coil spring 126 (Figs. 1 and 4) is stretched between the bracket 54 and a part 128 on or associated with the lower part of the carriage 62. The spring normally holds the carriage in raised position, and is stretched as the carriage is lowered by the motor 92. The stretched spring serves to raise the carriage and the toast carriers at the end of a toasting operation.

Means is provided for latching the carriage in lowered position and comprises a latch bar 130 as shown in Figs. 1 and 3. The latch bar is provided with a pair of upstanding ears 132, and this pair of ears is pivotally mounted on the pin 134 between a pair of ears (not shown) upstanding from the frame 20. A finger 138 extends from the front ear 132 longitudinally of the latch bar 130 and is adapted for cooperation with a tooth 140 on the member 128 at the bottom of the carriage. The latch bar is normally biased in a counterclockwise, carriage releasing position by means of a coil spring (not shown) encircling the pin 134.

As the carriage is lowered by the motor 92, the bottom edge of the tooth 140 strikes the latch bar 130 to pivot the latch bar in a clockwise direction. This causes the finger 138 to pivot into position above the tooth 140 to hold the carriage in lowered position against the action of the spring 126. The extending end 143 of the latch bar engages the beveled upper edge 144 of a holding detent 146 and cams the detent aside until the extending end of the latch bar has passed the tooth 148 of the detent. The detent is spring urged into the position shown, and the spring biasing of the detent returns it to its normal position so that the tooth 148 engages above the extending end 143 of the latch bar to hold it in the position shown in Fig. 3 with the carriage latched in lowered position.

The detent 146 is controlled by a timing mechanism (not shown) of any conventional construction, such as a thermal timing mechanism. After a predetermined toasting interval, the timing mechanism acts to withdraw the detent 146 to release the extending end 143 of the latch bar 130. The spring about the pivot of the latch bar (not shown) and the upward force exerted on the finger 138 of the latch bar by the tooth 140 of the carriage rotate the latch bar in a counterclockwise direction to release the carriage which is then raised by the spring 126.

The toasting interval may be varied to produce light or dark toast by rotating a knob 150 (Fig. 1) positioned externally of the toaster housing 24. This knob is fixed on a shaft 152 rotatably mounted on a plate 154 upstanding from the frame 22. An axially elongated pinion 156 is mounted on the shaft and rotates with the knob 150. The pinion meshes with a gear segment 158 on a control lever pivotally mounted on plate 154 at 160. The opposite end of the lever is provided with a skewed tip 162 forming a cam engaging a suitable member (not shown) linked to the timing mechanism to render the timing mechanism operative to withdraw the detent after any preselected interval to release the carriage for raising the toast. The shaft 152 is axially slidable and is adapted, in response to axial pressure on the knob 150, to engage a suitable member (not shown) for manually retracting the detent 146 to effect raising of the carriage at any time.

The toaster also includes a switch mechanism shown physically in Figs. 1 and 3, and schematically in Figs. 2 and 8. The switch mechanism is identified generally by the numeral 164. The switch mechanism 164 comprises a first contact carrying blade 166 having a contact button 168 thereon. The contact carrying blade continues as a right angularly disposed strip 170 which is riveted or otherwise permanently secured to an insulating plate 172 as at 173. The insulating plate is riveted or otherwise permanently mounted on a vertically disposed mounting plate 174, and this mounting plate has a right angularly disposed flange 176 secured to the right-hand end plate 32, and a foot 178 secured to the frame 22. Suitable apertures are provided in the mounting plate 174 to provide clearance for the rivets or other fasteners 173, and for other fasteners as hereinafter will be apparent.

The strip 170 continues as a horizontal or offset strip 180 to the windings of the motor 92. A strip 264 is secured at its lower end to a contact returning from the motor windings, and also to the offset tip of an L-shaped strip 260 leading to the terminal 44 of the toasting oven or heating coils.

A pivot pin 182 extends transversely from the upper edge of the mounting plate 174, and a double throw switch blade 184 is pivotally mounted on this pin by means of a pair of apertured, upstanding ears 186. The blade 184 carries a lower contact 188 cooperable with the contact 168, and also carries an upper contact 190, it being understood that these contacts are connected to one another and are insulated from the arm 184. The free end of the blade 184 is provided with a tongue 192 of reduced width. A spring 194 is stretched between the blade 184 and a laterally extending ear (not shown) on the mounting plate for urging the blade downwardly.

Downward movement of the blade 184 is resisted by a retainer 198 having a central slot 200 elongated in a vertical plane and receiving the tongue 192 of the blade 184. The slot is sufficiently wide to receive the tongue 192, but not to receive the remainder of the blade 184. The retainer 198 is pivotally mounted by means of a pair of ears 202 apertured to receive a pin 204 extending transversely from the top of the mounting plate 174. A spring 206 is stretched between the retainer 198 (shortly below the pivot thereof) and an upstanding tail 208 shortly to be described. This spring normally maintains the retainer 198 biased against the shoulders of the blade 184 where the blade is reduced in width to form the tongue 192

An upper contact carrying blade 210 is pivotally mounted on the pin 182 along with the blade 184 by means of a pair of ears 212 embracing the ears 186. The tail 208 previously mentioned is formed integral with the blade 210, and the top blade 210 is urged toward the intermediate blade 104 by the aforementioned spring 206. Downward movement of the blade 210 is limited by a mechanical stop in a form of a finger 214 projecting at right angles from the top of the mounting plate 174. The upper blade 210 is provided on its under surface with a contact button 216 aligned with the button 190 on the intermediate blade, and designed to contact the button 190 when the intermediate blade is in its raised position.

A spring 218 is stretched between the top of the box-shaped bracket 74 and an upstanding tail 220 on the carriage 62. This spring normally tilts the box-shaped bracket 74 and the accompanying bread or toast carriers 76 to the position shown in Figs. 1 and 8.

A plunger 222 (Figs. 1 and 3) having an enlarged head 224 is mounted for axial movement in aligned apertures in the top edge of the bracket 74 and in an ear 226. The plunger is spring urged upwardly by a coil spring 228 compressed between the ear 226 and a clip or other projection (not shown) on the plunger beneath the upper edge of the bracket 74. With the bracket 74 and carriers 76 tilted to the position shown in Figs. 1 and 8, the head 224 of the plunger is displaced slightly from the retainer 198. When the carriers and box-shaped bracket are pivoted by the weight of the slice of bread to bring the carriers into horizontal position, the head 224 engages the retainer 198 to pivot the retainer away from the tongue 192 of the intermediate blade 184 to allow the blade to be pulled down by the spring 194.

A slide rod 230 is mounted vertically for reciprocation in aligned apertures in an ear 196 on the mounting plate 174, and in another ear 232 extending from the plate 174 near the bottom thereof. The rod is positioned beneath a part of the intermediate blade 184 for engaging the blade 184 while clearing the fixed blade 166. A coil spring 234 encircles the rod and is trapped between the ear 196 and a wire clip 236 fitting in an annular groove in the rod for urging the rod downwardly.

The end of the latch arm 130 opposite the end 143 and hereinafter identified by the number 238 is positioned beneath the rod 230 and is provided with a stop in the form of an enlarged head 240 on a bolt (not shown) threaded into the end 238 of the latch bar 130. A jam nut 244 on the bolt locks the bolt in adjusted position.

When the latch bar 130 is pivoted in a clockwise direction as a result of engagement of the finger 138 thereon by the carriage, the rod 230 is raised against the force of the spring 234 to engage and raise the central blade 184 as will be pointed out in greater particularly hereafter.

A strap-like conductor 246 leads from one of the input connections 248 of the toaster to a bracket 250 mounted on the insulating plate 172, a suitable aperture being provided in the mounting plate 174 to provide clearance for the connections mounting the bracket 250. A flexible lead 254 extends from the bracket 250 to the upper contact 190 on the intermediate blade 184, the two contacts 188 and 190 on this blade being electrically connected together and insulated from the blade 184 by any suitable or convenient means (not shown).

The other input connection 256 to the toaster is connected by a conductor 258 to a timer 259 indicated schematically in Fig. 2 as a double acting thermal timer of known design. The timer is not shown physically as previously has been indicated, but preferably is located within the housing 24 below the motor 92, and preferably immediately below the detent 146. The timer is connected by a conductor indicated schematically in Fig. 2 at 262 to the heating or toasting coils 40 of the oven. It will be apparent from the showing in Fig. 2 that there preferably are four toasting coils connected in parallel, and that the wire 262 is connected to the coils or heating elements at the opposite common end thereof from the conductor 260. The strap or conductor 264 previously indicated as connected to the motor lead 181 and the strap 260 is suitably mounted on the insulating plate 172 (the necessary apertures to insulate the mounting means being provided in the mounting plate 174), and the upper end of the strap 264 is connected by means of a flexible wire 266 to the contact 216 on the upper blade 210, the contact being insulated from the blade by any suitable or desirable means.

The motor 92 includes a rotor which is not shown physically, but which is indicated schematically by dotted lines at 268 in Figs. 4 and 5. The rotor is mounted on a motor shaft 270 (see also Fig. 6) journalled in bearings 272 attached to suitable frame pieces 274 of the motor. A spur gear 276 forming a part of the gear train 122 is fixed on the end of the motor shaft 270, projecting through a suitable aperture in a part of the bracket 94.

A stud 278 extends from the bracket 94 in the opposite direction from the motor 92. A bronze bushing 280 is rotatably mounted on this stud, and a large gear 282 is fixed on this bushing for rotation relative thereto. The gear 282 meshes with the spur gear 276, and forms an additional part of the gear train 122. The gear 282 is formed with a series of arcuately spaced depressions 284 in its outer face. In the illustrative example of the invention, there are eight such depressions, and the depressions are formed by stamping, whereby there are corresponding protuberances on the back face of the gear. Each of the depressions 284 comprises a ramp or cam surface 286 deepening into the face of the gear progressing clockwise thereof as viewed in Fig. 7, and ending in a shoulder or stop 288.

The gear 282 with the depressions 284 therein forms a driving clutch member, and a driven clutch member 290 is mounted on the bushing 280 for rotation thereon against the face of the gear 282. The pinion gear 124 is fixed on the driven clutch member 290 for rotation therewith, and a spring clip 292 received in a circumferential groove 294 near the end of the stud 278 holds the driven clutch member 290 and pinion 194 on the bushing 280, and also holds the bushing, and hence the gear 282, on the stud 278.

The driven clutch member 290 comprises a sheet metal spring member having a more or less circular central body portion 296 held on the inner end of the pinion gear 194, as by peaning over a reduced section of the pinion. The central body portion 296 preferably is dished so as to be slightly concave toward the gear 282. Arms 298 extend outwardly and generally tangentially from the body 296. Laterally extending tips 300 on the arms are flexed toward the gear 282 so as to extend into the depressions 284. The ends 302 of the tips are arcuately spaced apart slightly less than 180° (in a counter-clockwise direction, as viewed in Figs. 5 and 7) by virtue of the fact that the arms 298 are not quite parallel. As a result, when one of the ends engages a shoulder 288 of a depression the other is positioned partly up the inclined surface or cam ramp 286 of the diametrically opposite depression. More specifically, the end 302 that is not seated against a shoulder 288 is approximately mid-way between adjacent shoulders substantially diametrically opposite to the shoulder engaged. As a result, when there is relative movement between the driving and driven clutch members, it is not necessary for the driving clutch member, when moving in driving direction, to move the full angular distance between successive shoulders in order to pick up one of the ends 302 of the driven clutch member.

It will be apparent that when there are forces which tend to rotate the gear or driving clutch member 282 clockwise relative to the driven clutch member (as viewed in Figs. 5 and 7), the tips 300 of the arms 298 of the driven clutch member 290 will simply ratchet over the face of the driving clutch member. Upon rotation in the opposite direction, one of the ends 302 will encounter a stop or shoulder 288, and the clutch members will move together as a unit.

*Operation*

In the normal quiescent condition of the toaster, the bread supports 76 are in the raised position shown in Figs. 1, 3, and 8. The switch blade 184 is held in intermediate position by the tongue 192 thereof resting at the bottom of the slot 200 in the retainer 198. When the bread supports are lowered by the weight of a slice of bread, the head or tappet 224 of the rod 222 engages the right side of the retainer 198 as viewed in Figs. 1 and 8, and pivots the retainer clockwise against the force of the biasing spring 206. This releases the switch blade 184 which is lowered by the spring 194. Accordingly, the contact 188 engages the contact 168, and a circuit is completed through the motor 92, through the heating coils 40, and through the thermal timer 259. The motor runs and acts through the drive train 122, the clutch hereinafter identified by the numeral 304, and the pinion 124 and rack 82 to lower the toaster carriage. As noted heretofore, the bottom edge of the tooth 140 strikes the latch bar 130 to pivot the latch bar in a clockwise direction, thereby causing the finger 138 to engage above the tooth to hold the carriage in lowered position, and causing the extending end 143 of the latch bar to engage beneath the tooth 148 of the detent. Additionally, the tappet 240 is raised, and moves the slide rod 230 upwardly. The upper end of the slide rod engages the switch blade 184, and shifts it upwardly, thereby separating the contacts 188 and 168, and bringing the contact 190 into engagement with the contact 216. This cuts the motor 92 out of the circuit, but maintains the toasting coils 40 and the thermal timer 259 energized.

The tooth 140 in striking the latch bar 130, acts as a bumper for stopping the downward motion of the carriage. The resilience of the parts such as flange 68 and the latch bar 130 first absorbs the momentum of the carriage and also the much greater rotational momentum of the motor, and then with the help of the spring 126, reverses both the carriage and the motor. The latch finger 138 arrests the rebounding carriage but the over-running clutch 282—290 lets the motor spin free. Consequently, the rotating motor is effectively disconnected from the carriage after the initial rebound for reducing the noise and vibrations and the stresses on the mechanism.

At the conclusion of a toasting operation as determined by the thermal timer 259, the thermal timer withdraws the detent 146 to release the extending end 143 of the latch bar 130. The spring about the pivot of the latch bar (not shown) and the upward force exerted on the finger 138 of the latch bar by the tooth 140 under the influence of the spring 126 rotate the latch bar in a counter-clockwise direction to release the carriage, which is then raised by the spring 126. Such movement of the latch bar 130 lowers the tappet 240 and the spring 234 thus lowers the slide bar 230. The switch blade 184 thus is free to drop under the influence of the spring 194, and the contacts 216 and 190 accordingly are separated, and the toaster is deenergized. The tongue 192 again engages within the slot 200 of the retainer, and the switch blade is held in the intermediate position.

As the carriage 62 rises under the influence of the spring 126, the head or tappet 224 of the rod 222 engages beneath the end of the retainer 198, and moves back against the force of the spring 228. Upon removal of the toasted bread, the spring 218 pivots the supports and the bracket 74 back to the position shown in Figs. 1, 3, and 8, and the tappet or head 224 pops upwardly so as to be in position to engage the side of the retainer 198 upon the instituting of another toasting cycle.

The motor shaft 270 operates in a clockwise direction as viewed in Fig. 5 upon energization of the motor. This causes counter-clockwise rotation of the gear 282, and one of the shoulders 288 of the depressions 286 accordingly engages a tip end 302 to drive the driven clutch member, and hence to act to lower the carriage. When the carriage is raised by the spring 126, the action is reversed. One of the tip ends 302 engages a shoulder 288 to drive the gear 282 clockwise, and the motor shaft hence is rotated in a counter-clockwise direction. Considerable inertia is built up in the rotating motor shaft and rotor 268, and when the flange 66 of the carriage engages the spring 58 at the top of the rod 56, the carriage stops rather abruptly, and the rack 82 and pinion 124 cause the driven clutch member to stop equally abruptly. However, the inertia of the rotor and shaft tends to keep these parts in rotation, and continues to drive the gear 282 in a clockwise direction. The depressions 286 simply rachet past the tips 300 of the driven clutch member, and the rotor and motor shaft slowly come to rest. In this manner, shocks on the drive mechanism are avoided.

Although a particular embodiment of the invention has been shown and described, it will be understood that this is for illustrative example only, and that various changes in structure will no doubt occur to those skilled in the art. Such changes are to be understood as forming a part of this invention insofar as they fall within the spirit and scope of the appended claims.

The invention is claimed as follows:

1. A toaster comprising a housing, toasting means within said housing, bread carrying means in said housing for carrying bread between non-toasting position and toasting position adjacent said toasting means, and an electric motor, drive means including a clutch interconnecting said motor and said bread carrying means and operative upon operation of said motor in one direction to move said bread carrying means from one of said positions to the other, and spring means for reversely moving said bread carrying means between said positions, said clutch comprising a driven member and a driving member, the driving member comprising a disc mounted for rotation, said driven member having projections thereon urged resiliently toward the face of said disc, said driven member being mounted coaxially with said disc, and said disc having a plurality of arcuately spaced depressions therein providing stops drivingly engageable with said projections upon one direction of rotation of said disc, and not drivingly engageable with said projections in the other direction of rotation of said disc.

2. A toaster as set forth in claim 1 wherein the depressions are defined by cam surfaces and internal shoulders, said internal shoulders forming the stops.

3. A toaster comprising a housing, toasting means within said housing, bread carrying means in said housing for carrying the bread between non-toasting position and toasting position adjacent said toasting means, an electric motor, drive means including a clutch interconnecting said motor and said bread carrying means and operative upon operation of said motor in one direction to move said bread carrying means from one of said positions to the other, and spring means for reversely moving said bread carrying means between said positions, said clutch including a driving member and a driven member mounted for coaxial rotation, one of said members having a plurality of stops thereon, and the other of said members having a plurality of projections engageable with said stops for rotation of said clutch members as a unit upon rotation of said driving member in one direction, but not upon rotation of said driving member in the other direction, the stops on said one of said clutch members being equally arcuately spaced, and the projections on the other clutch member being spaced a predetermined distance which is not an integral multiple or submultiple of the spacing between said stops.

4. A toaster comprising a housing, toasting means within said housing, bread carrying means in said housing for carrying bread between non-toasting position and toasting position adjacent said toasting means, an electric motor, drive means including a clutch interconnecting said motor and said bread carrying means and operative upon operation of said motor in one direction to move said bread carrying means from one of said positions to the other, and spring means for reversely moving said carrying means between said positions, said clutch comprising a driving clutch member and a driven clutch member, one of said clutch members comprising a disc mounted for rotation and having a plurality of depressions in the face thereof, said depressions being formed by cams and internal shoulders, said depressions being equally arcuately spaced, and the other of said clutch members having a plurality of projections thereon resiliently urged against the face of said disc, said other clutch member being mounted for coaxial rotation with said disc, said projections engaging said stops upon one direction of rotation of said motor in the opposite direction, the arcuate spacing between said depressions and the spacing of the projections being other than integral multiples of one another.

5. A toaster comprising a housing, toasting means within said housing, bread carrying means in said housing for carrying the bread between a non-toasting position and a toasting position adjacent to said toastng means, an electric motor, drive means including an over-running clutch having cooperated members, one of said members being connected to said motor and the other member being connected directly to said bread carrying means, said drive means being operative upon operation of said motor in one direction to move said bread carrying means from one of said positions to the other, and bumper and latch means for stopping and holding said bread carrying means in said other position, said over-running clutch preventing the rebound momentum of said motor from being applied to said holding means.

References Cited in the file of this patent

UNITED STATES PATENTS

| | | |
|---|---|---|
| 2,061,220 | Cotterman | Nov. 17, 1936 |
| 2,200,110 | Anderson | May 7, 1940 |
| 2,266,301 | Biebel | Dec. 16, 1941 |
| 2,361,446 | Anderson | Oct. 31, 1944 |
| 2,400,818 | Gallagher | May 21, 1946 |
| 2,615,386 | Palmer | Oct. 28, 1952 |
| 2,687,078 | Ihrke | Aug. 24, 1954 |
| 2,773,441 | Ireland | Dec. 11, 1956 |